(12) United States Patent
Levy

(10) Patent No.: US 11,675,663 B1
(45) Date of Patent: Jun. 13, 2023

(54) RECOVERY TIME OF EXECUTION INSTANCES

(71) Applicant: Harmonic, Inc., San Jose, CA (US)

(72) Inventor: Adam Levy, Pardes-Hana-Karkur (IL)

(73) Assignee: Harmonic, Inc., San Jose, CA (US)

( * ) Notice: Subject to any disclaimer, the term of this patent is extended or adjusted under 35 U.S.C. 154(b) by 106 days.

(21) Appl. No.: 17/411,592

(22) Filed: Aug. 25, 2021

Related U.S. Application Data

(60) Provisional application No. 63/071,025, filed on Aug. 27, 2020.

(51) Int. Cl.
| | |
|---|---|
| *G06F 11/00* | (2006.01) |
| *G06F 11/14* | (2006.01) |
| *G06F 9/445* | (2018.01) |
| *H04B 10/27* | (2013.01) |
| *H04L 41/5025* | (2022.01) |

(52) U.S. Cl.
CPC ...... *G06F 11/1438* (2013.01); *G06F 9/44505* (2013.01); *H04B 10/27* (2013.01); *H04L 41/5025* (2013.01)

(58) Field of Classification Search
CPC . G06F 11/1438; G06F 9/44505; H04B 10/27; H04L 41/5025
See application file for complete search history.

(56) References Cited

U.S. PATENT DOCUMENTS

| | | | | |
|---|---|---|---|---|
| 6,839,829 | B1* | 1/2005 | Daruwalla | H04L 45/22 709/239 |
| 7,068,712 | B1* | 6/2006 | Zang | H04N 7/173 375/222 |
| 7,991,888 | B1* | 8/2011 | Beser | H04L 47/762 725/111 |
| 2002/0038461 | A1* | 3/2002 | White | H04B 1/74 725/111 |
| 2003/0120819 | A1* | 6/2003 | Abramson | H04N 7/17309 714/41 |
| 2004/0034871 | A1* | 2/2004 | Lu | H04L 47/20 725/111 |
| 2021/0152386 | A1* | 5/2021 | Chari | H04L 45/586 |

* cited by examiner

*Primary Examiner* — Philip Guyton
(74) *Attorney, Agent, or Firm* — Brokaw Patent Law PC; Christopher J. Brokaw

(57) ABSTRACT

Recovering or restarting an execution instance. In response to detecting that a particular execution instance, in which a cable modem termination system (CMTS) software application, an optical line terminal (OLT) software application, and/or broadband network gateway (BNG) software application has failed, restarting the execution instance without adding any downstream service flow classifiers to the instance or configuring any entries of an access control list for the instance. After restarting the execution instance, over time adjusting the configuration of the instance to add one or more downstream service flow classifiers or access control list entries such that the instance can provide additional services, beyond a default service flow, to cable modems or optical network units. Support for voice calls may be initially added to the execution instance upon startup. Required time to register cable modems or optical network units with the execution instance is advantageously reduced while maintaining quality of service.

22 Claims, 6 Drawing Sheets

RECOVERY TIME OF EXECUTION INSTANCES

CLAIM OF PRIORITY

This application claims priority to U.S. Provisional Patent Application Ser. No. 63/071,025, filed Aug. 27, 2020, invented by Adam Levy, entitled "Improving CMTS CM Registration Time During Load/HA Scenarios by Lazy Creation of QoS," the entire contents of which are hereby incorporated by reference for all purposes as if fully set forth herein.

FIELD OF THE INVENTION

Embodiments of the invention relate to recovering or restarting an execution instance in which a software application supporting functions of a cable modem termination system (CMTS) or passive optical network (PON) executes.

BACKGROUND

Converged Cable Access Platform (CCAP) is a standard, proposed and administered by CableLabs of Louisville, Colo., for an architecture employed by a cable operator. CableLabs has publicly issued a Remote PHY family of specifications, known as the MHAv2 specifications (Modular Headend Architecture version 2). These specifications describe how a CCAP platform may be separated into two components, (1) a CCAP Core located at a cable headend, and (2) a Remote PHY device (RPD), which is typically located outdoors. A RPD may be located, for example, at the junction of the fiber and coax plants in an optical node serving as a Remote PHY Node (RPN).

The motivation behind CCAP is to lower the operating costs of cable operators via a single platform which can offer traditional video and broadband services to their consumers. CCAP is a managed architecture as it leverages existing cable technologies and makes provisions for new ones that may arise. As a result, cable operators may take many different paths towards conforming to the CCAP standard, and thereafter, may continue to evolve their architecture in different ways post-compliance to CCAP. The functions of a CCAP platform include but are not limited to those performed by a Cable Modem Termination System (CMTS). A CMTS, as is well-known in the industry, is a term that refers to equipment for providing high speed data services to cable subscribers.

A typical approach taken to ensure the high availability (HA) of a CMTS involves the use of implementing the CMTS using redundant hardware entities (such as redundant cards in a chassis or redundant servers in a cluster), with one of the hardware entities acting as a backup to the other active hardware entities. When a failure is detected or encountered in any software component executing upon an active hardware entity, then that hardware entity is considered failed and active software operations failover to the backup hardware entity. The failed hardware entity is typically rebooted to render it operational once more.

If anything goes wrong in the failover process, the entire workload for all cable subscribers handled by the failed hardware entity will experience a service outage. Since a single card in a chassis, or a single server in a cluster, typically handles thousands of subscribers, a failure in a software component that results in an entire hardware entity failing can result in a significant outage for the affected cable customers.

Certain network access applications, such as a software application that performs one or more CMTS functions, may execute in a cloud-based environment. Examples of services provided to subscribers by software applications performing CMTS functions support for voice or telephone calls and Internet access. Network access applications may be implemented as cloud-based execution environments, or pods, which implements a packet processing pipeline for the specific access technology, such as Data Over Cable Service Interface Specification (DOCSIS) MAC layer protocol, for example.

To ensure High availability (HA), a standby pod may also be instantiated for each worker pod. The standby pod is responsible for synchronizing data from one or more active pods. If one of the active pods fails, then the standby pod will assume responsibility for the failed pod. One or more active pods and at least one standby pod is termed a "protection group." To increase pod density, a standby pod may not be instantiated or used. Instead, when an active pod fails, the failed pod will be restarted or respun. Restarting or respinning pods in this manner will require a fast startup time for the pod.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for recovering or restarting an execution instance in less time than prior approaches are presented herein. In an embodiment, within a recovered or restarted execution instance, an application such as a cable modem termination system (CMTS) software application, an optical line terminal (OLT) software application, or broadband network gateway (BNG) software application, may be deployed. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form or discussed at a high level to avoid unnecessarily obscuring teachings of embodiments of the invention.

As broadly used herein, the term execution instance refers to any self-contained or bounded set of hardware and software resources used to execute one or more software processes. Non-limiting, illustrative examples of an execution instance include a virtual machine, a software container, and a pod. A pod is a collection of bounded computational resources for executing software that is managed as a cohesive whole. One example of management software capable of managing pods is Kubernetes, which is an open-source container-orchestration system. Additional details of the operation of pods are discussed in U.S. patent application Ser. No. 16/748,124, entitled 'High Availability and Software Upgrades in a Virtual Cable Modem Termination System, filed on Jan. 21, 2020, the entire contents of which are incorporated by reference in their entirety for all purposes as if they were fully set forth herein.

Figure 1A:
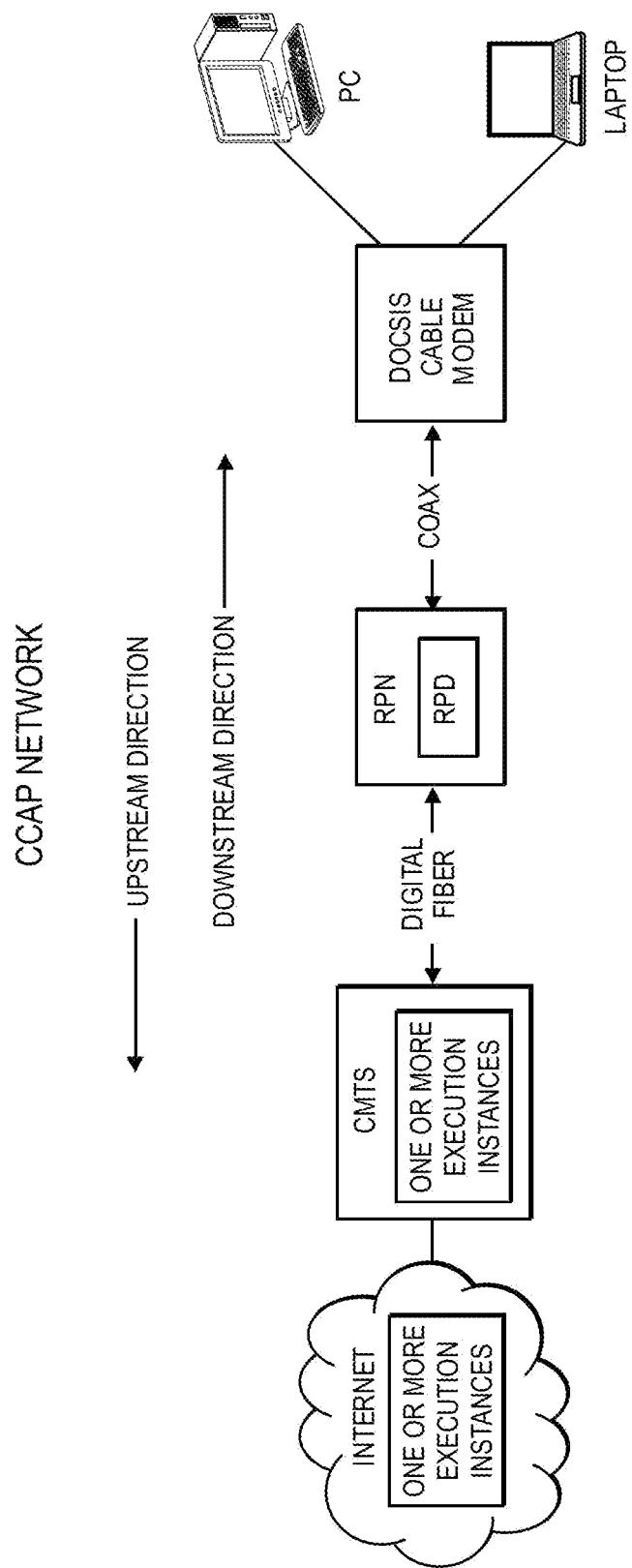
FIG. 1A is a block diagram of a Converged Cable Access Platform (CCAP) network in accordance with an embodiment of the invention.

Execution instances may execute in a variety of different contexts. To illustrate two such contexts pertinent to embodiments of the invention, consider FIGS. 1A and 1B. FIG. 1A is a block diagram of a Converged Cable Access Platform (CCAP) network in accordance with an embodiment of the invention. As shown in FIG. 1A, one or more execution instances may execute at a Cable Modem Termination System (CMTS) located at a cable headend. In each of the execution instances, a CMTS software application may execute. A CMTS software application is an application that performs one or more CMTS functions for one or more cable modems (CMs). A CMTS software application may also operate in an execution instance as part of a cloud-based deployment at a location accessible by the cable headend over the Internet.

Figure 1B:
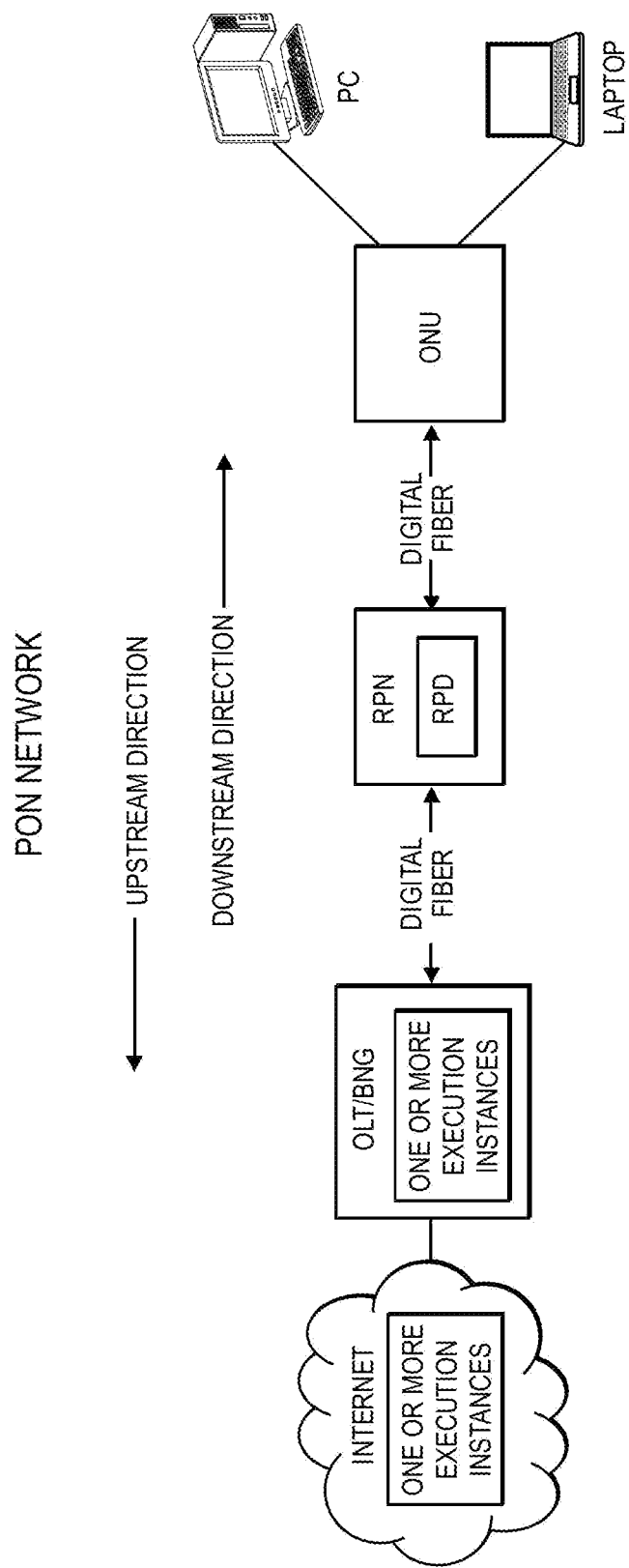
FIG. 1B is a block diagram of a passive optical network (PON) network in accordance with an embodiment of the invention.

Execution instances of an embodiment may also be used in the context of a passive optical network (PON), such as that shown in FIG. 1B. In each of the execution instances shown in FIG. 1B, an optical line terminal (OLT) software application and/or a broadband network gateway (BNG) software application may execute. A OLT software application is an application that performs OLT function for a set of optical network units (ONUs). A broadband network gateway (BNG) software application is an application that performs BNG functions for a set of ONUs. Alternately, a OLT or BNG software application may operate in an execution instance as part of a cloud-based deployment at a location accessible by the cable headend over the Internet.

Figure 2:
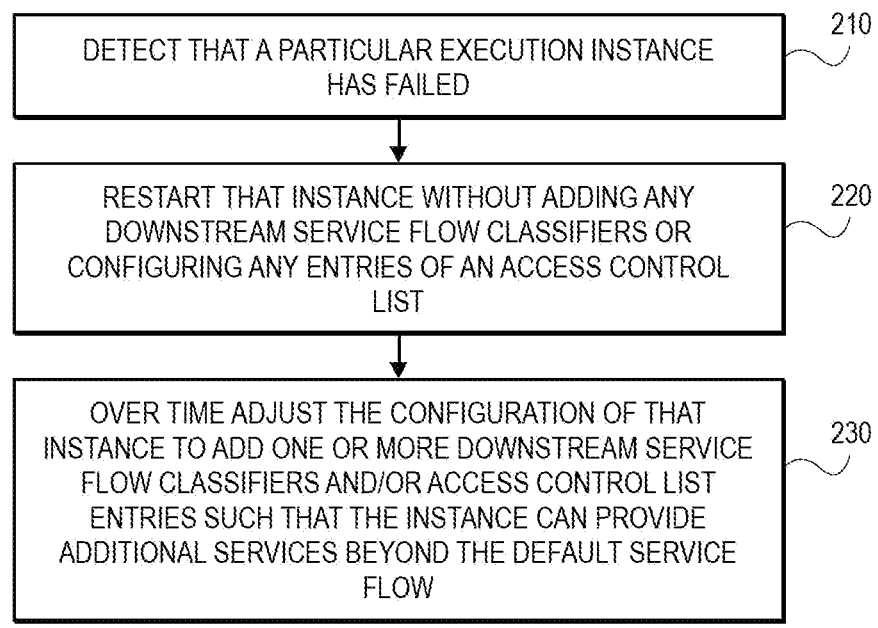
FIG. 2 is a flowchart illustrating the functional steps of recovering or restarting an execution instance in accordance with an embodiment of the invention.

When an execution instance fails, it is advantageous for a variety of reasons to recover, restart, or respin (in the technical parlance) the failed execution instance as soon as possible. FIG. 2 is a flowchart illustrating the functional steps of recovering or restarting an execution instance in accordance with an embodiment of the invention. The steps of FIG. 2 below shall chiefly be discussed in relation to a concrete example involving a CMTS; however, other embodiments may be employed in the PON network shown in FIG. 2, with the use of ONUs and OLT/BNG standing in for CMs and the CMTS respectively.

One of the bottlenecks in realizing a quick restart time for a failed execution instance is the internal build time necessary to create downstream Service Flow (SF) classifiers & Access Control Lists (ACLs) within a packet processing application deployed within the execution instance. A Service Flow (SF) represents a different set of services provided to a Cable Modem (CM) in a CCAP network or to a ONU in a PON network. A SF classifier is a type of ACL that classifies and matches packets into their correct SF.

Each CM or ONU is associated with a set of classifiers and service flows that are configured by the CMTS during CM registration (in the context of a CCAP network) or by an OLT/BNG during ONU registration (in the context of a PON network). When an execution instance executing a CMTS software application has a need to transmit a packet to a particular CM, the execution instance uses a set of classifiers to classify the packet, where the first match in the set of classifiers identifies the particular Service Flow (SF) to use in transmitting the packet to the CM. A similar process is used by an execution instance executing an OLT/BNG software application to transmit a packet to a particular ONU using an appropriate SF.

Classifiers and service flows can be defined for a cable modem during its registration with the control plane of the CMTS. Classifiers and service flows may also be defined for a cable modem at some point after its registration, such as is the case when it is performed dynamically for a voice call.

In step 210, it is determined or detected that a particular execution instance has failed. As a result, the failed execution instance should be recovered, restarted, or respun as soon as possible to promote High Availability (HA).

To reduce the time required to recover or restart the failed execution instance, an embodiment may create the classifiers and SFs (after the packet processing application has already started) gradually or in partial manner to start servicing the CMs as soon as possible; instead of waiting for all SF and classifiers to be created before starting to service the CMs.

In step 220, the particular execution instance is restarted without adding any downstream service flow classifiers to the instance or configuring any entries of an access control list for the instance. One of the Services Flows (typically the first SF in the CM config file) is used as the "default SF," which means that if a packet had no match with the classifier set, then the packet is classified into the default SF. This SF usually represents the "best effort"! high speed data service. It is always possible to use the default SF, which does not require any classifiers.

In an embodiment, the performance of step 220 may result in partially configured quality of service (QoS) state having a single default service flow (SF) entry in each cable modem (CM) classification table. FIG. 3B is an illustration of a partially configured quality of service (QoS) state having a single default service flow (SF) entry in the cable modem (CM) classification tables in accordance with an embodiment. Table 320 represents a general MAC table that leads to a classification table. In the example of FIG. 3B, table 322 is the classification table for CM1, and table 324 is the classification table for CM2. CM1 is shown as being coupled to two CPE in the entries of table 320, namely the entries that are labeled CM1-CPE1 and CM1-CPE2. CM2 is shown as being coupled to one CPE in the entries of table 320, namely the entry labeled CM2-CPE1. A CMTS or an OLT/BNG may use table 320 in identifying the destination to which a packet should be delivered.

Thereafter, in step 230, after restarting the execution instance, over time the configuration of the recovered instance is adjusted to add one or more downstream service flow classifiers or access control list entries to the recovered instance such that the instance can provide additional services, beyond a default service flow, to cable modems or optical network units. Required time to register cable modems or optical network units with the execution instance is advantageously reduced while maintaining quality of service.

During the time when not all of the service flows and classifiers for the recovered execution instance have yet been created, it is nevertheless guaranteed that traffic intended to reach a particular CM or a particular ONU is transmissible via the default service flow. Reaching a fully configured Quality of Service (QoS) state where all service flows and classifiers are created takes additional time. During that time, CMs and ONUs will stay online and their traffic will continue to be sent, though with reduced QoS for some time until all the service flows and classifiers for the recovered execution instance are created.

Figure 3A:
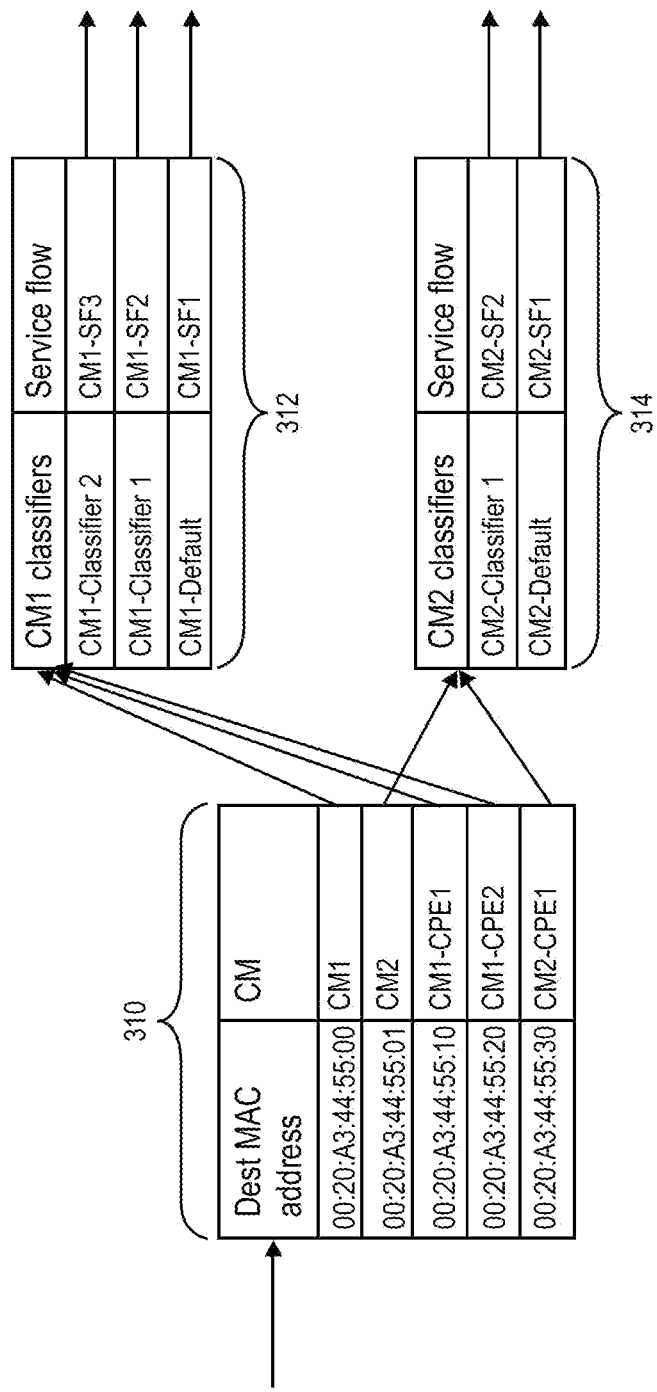
FIG. 3A is an illustration of a fully configured quality of service (QoS) state with exemplary customer premises equipment (CPE) in accordance with an embodiment of the invention.
Figure 3B:
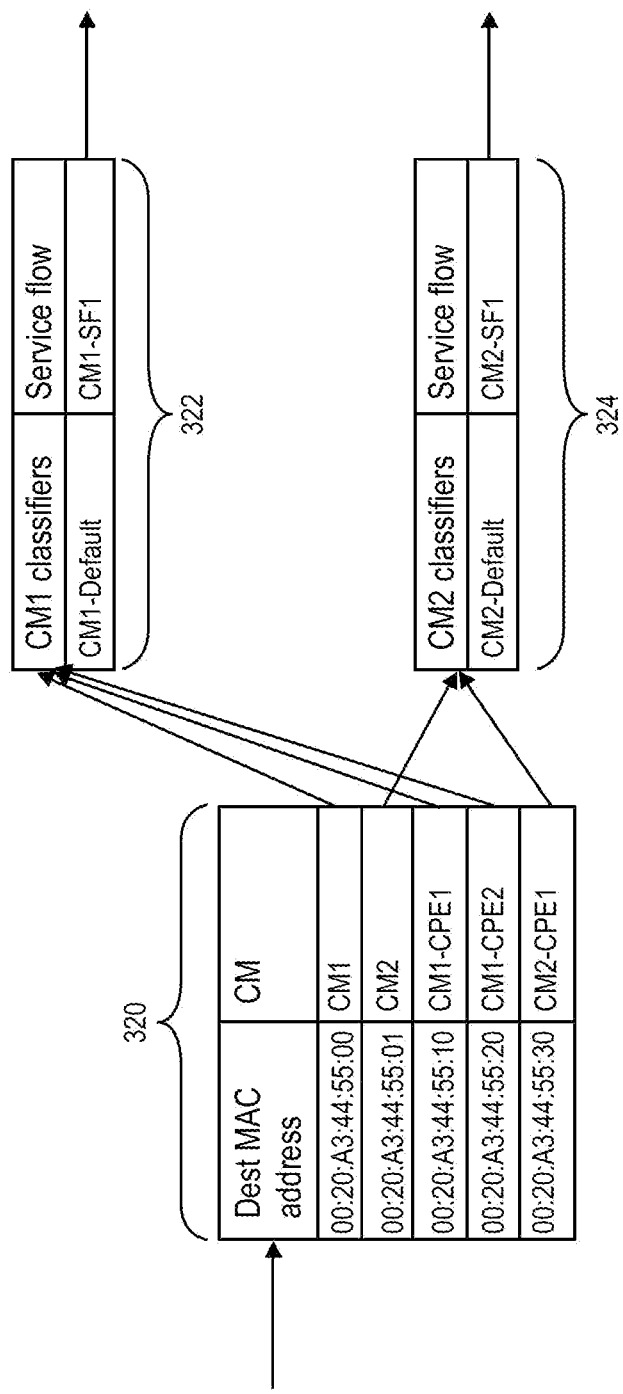
FIG. 3B is an illustration of a partially configured quality of service (QoS) state having a single default service flow (SF) entry in the cable modem (CM) classification tables in accordance with an embodiment of the invention.

FIG. 3A is an illustration of a fully configured quality of service (QoS) state with exemplary customer premises equipment (CPE) in accordance with an embodiment of the invention. In the example shown by FIG. 3A, two cable modems, i.e., CM1 and CM2, are represented. CM1 is shown as being coupled to two CPE in the entries of table 310, namely the entries that are labeled CM1-CPE1 and CM1-CPE2. CM2 is shown as being coupled to one CPE in the entries of table 310, namely the entry labeled CM2-CPE1. Table 310 represents a general MAC table that leads to a classification table. In the example of FIG. 3A, table 312 is the classification table for CM1, and table 314 is the classification table for CM2. A CMTS or an OLT/BNG may use table 310 in identifying the destination to which a packet should be delivered.

Table 310 comprises multiple entries that each identify a destination MAC address associated with either (a) a particular cable modem or (a) a particular unit of customer premises equipment (CPE) that is operationally connected with one of the cable modems included in table 310. The destination MAC address of each entry is used to identify the address at which the classification table for the cable modem associated with that entry may be found. When an entry of table 310 is associated with a cable modem, the destination MAC address of that entry is the location of the classification table for that cable modem. For example, the first row in table 310, associated with cable modem CM1, comprises the destination MAC address of cable modem CM1.

When an entry of table 310 is associated with a particular unit of customer premises equipment (CPE), the destination MAC address of that entry is the location of that CPE. However, when an entity interprets table 310 to locate the classification table for the CPE, it will be apparent that the destination MAC address for that CPE is behind the destination MAC address of the cable modem to which the CPE is operationally connected given the layout of MAC addresses in the network. The classification table for a CPE is found at the cable modem to which a CPE is operationally connected. For example, the third row in table 310, associated with customer premises equipment CPE1, which is operationally connected with cable modem CM1, comprises the destination MAC address of customer premises equipment CPE1. The classifiers and service flows defined for a cable modem apply to both the cable modem itself as well as to any customer premises equipment (CPE) having a network address behind that cable modem (i.e., the CPE is operationally connected to the CM). There is no special classification performed for CPE; instead, the CPE's traffic uses the classification and service flows configuration of the CM to which is it behind and operationally connected. Thus, the MAC address lookup table is a flat table for both CMs and CPEs where each record has the same type of keys and result. The key is a MAC address, and the result is the CM's classification table (via some index or pointer). When knowledge of a CPE is learned by the control plane, the control plane configures the MAC table with the CPE MAC address and the result of the CM's classification table to which that CPE is operationally connected and behind in the network.

Multiple classifiers can identify the same service flow. For example, in table 312 shown in FIG. 3A, CM1-classifier2 may also resolve to CM1-SF1 service flow. Thus, while each classifier depicted in FIGS. 3A and 3B resolves to a unique service flow, that need not be the case across all embodiments.

If table 310 were empty, then all packets would be dropped. To facilitate the routing of packets using only default service flows, table 310 would be comprised of entries that point to "empty" CM classification tables, where each CM classification table consists of a single entry with only the default SF, an example of which is shown in FIG. 3B.

In classification tables 312 and 314, there is represented default service flows and non-default service flows, the latter of which requires classification. For example, classification table 312 is the classification table for CM1 and identifies the service flows to use when sending packets to CM1. Classification table 312 specifies two different service flows to use if the associated classifier is applicable. Classification table also specifies the default service flow to use when sending packets to CM 1 if none of the classifiers specified by classification table 312 are applicable. Note that classifiers specified in classification table 312 may be different than those specified by classification table 314.

As used herein, the term 'classifier' refers to an access control list (ACL) that identifies a classified (i.e., non-default) service flow. The first classifier in a table to successfully match a packet is considered a "match" and is used to identify the classified service flow to use when sending that packet to its destination. As a result, there is an order or priority to the listing of classifiers in a table. Typically, potential matches of greater specificity are checked before potential matches of a more general nature. For this reason, default service flows are usually associated with the last or lowest priority rule in a table.

A classifier may resemble or be composed of fields from different protocols (such as Ethernet, IP, TCP, and UDP) with values and/or masks. When a packet is compared to a particular classifier, the packet either matches that classifier or the packet does not match, depending on each bit in the packet and its corresponding bit in the classifier. In other words, there is no ambiguity in the result of the comparison of a packet to a classifier.

DOCSIS has specific definitions for what fields and protocols should be supported in classifiers, but classifiers are used in communication industry outside of the DOCSIS context, including deep packet inspection (DPI) and security ACLs. DOCSIS classifiers may be complicated and specify a range of values which translate to multiple classifier entries.

Packets may be compared against a set of classifiers using hardware or software. Benefits may be obtained by embodiments of the invention regardless of whether the comparison of packets against classifiers is performed in hardware, software, or a combination of both. In hardware, classifiers are usually implemented using a ternary content-addressable memory or TCAM, where each bit is either 0, 1, or "don't care"—a single electric "pulse" provides the first match result. In making a comparison in software, classifiers are usually implemented by a tree data structure. In either case, establishing and configuring a complete set of classifiers requires a certain amount of time, the impact of which can be advantageously sidestepped, minimized, or avoided when recovering or restarting an execution instance in accordance with an embodiment. For example, when recovering from a hardware failure, the recovery may involve correcting the original hardware device or staring a redundant hardware device, even with the same software execution instance.

In the performance of step 230, certain embodiments may create downstream service flows and their classifiers in an order based on service level agreements. For example, if a service level agreement associated with a particular set of cable modems guarantees a specified level of QoS for a particular service, then the establishment of service flows and their classifiers for that service will be given priority over those services without such a guaranteed QoS per a service level agreement. As those downstream services flows and their classifiers may only be used after they are created, creating those downstream services flows and their classifiers having the greatest need per service level agreements advantageously enables those agreements to be satisfied to the fullest extent possible.

In the performance of step 230, other embodiments may create downstream service flows and their classifiers in an order that is based, at least in part, on the present load upon hardware and/or software resources. In this way, particular service flows that are more susceptible to load upon available resources may be established first for a restarted execution instance over other service flows that are more tolerant to greater load levels upon system resources.

As another example, downstream voice service flows (and other low latency services) may be prioritized to be created immediately or as soon as possible after the default downstream SF (and before other SFs are being created) to ensure QoS is provided to sensitive services in a short amount of time as possible. Indeed, some embodiments may provide support for voice calls initially to the recovered execution instance upon startup in step 220.

Voice calls service flows may be created dynamically. As a result, the creation of voice call service flows and their classifiers typically happens after a cable modem is online. Thus, the creation of voice call service flows would generally happen after all other service flows and their classifiers were already created. For voice service, guarantees of certain levels of quality of service (QoS) are needed immediately if there is any congestion or the service will unusable. Since each execution instance of an embodiment is generally not expected to support more than tens of voice calls at a given time, the added load for creating these service flows and their classifiers might be insignificant. Accordingly, it is an option to prioritize the creation of voice service flows and their classifiers such that they are added in step 220 upon the recovery of the execution instance. Alternately, they may be added after the recovery of the execution instance in step 230 but added as soon as possible in accordance with current levels of congestion.

Classifiers for service flows associated with voice calls have a unique property which may be utilized by certain embodiments. Classifiers for service flows associated with voice calls are typically a 5-tuple classifier, and as a result, always unique. As a result, service flows associated with voice calls may be offloaded by certain embodiments from the regular pipeline to either a NIC or to a preliminary classification stage for voice calls. Other types of service flows may be handled in this same fashion, e.g., dynamically created service flows, such as PCMM (packet cable multimedia).

Embodiments of the invention may perform optimized classifier rebuilding in step 230. Embodiments may also save the time required to recover an execution instance by serializing a binary classifier into a database or other persistent storage medium and thereafter deserialize it into a data structure rather than rebuilding the data structure from scratch by ACL compilation.

Embodiments may also assist the performance of a large amount of cable modem registrations. For example, embodiments may be beneficially used to register a large number of CMs during a "registration storm" when a large number of CMs register at the same time. Embodiments may be used in such a registration storm to ensure service may be provided to as many CMs or ONUs as possible in the shortest amount of time, which the ability to provide enhanced QoS to those CMs or ONUs during the performance of step 230.

Embodiments of the invention may also be used to achieve faster standby recovery when using a standby pod or execution instance, as the standby pod or execution instance may employ an embodiment to become online in less time to allow an active pod to reach protected status faster. Thus, the execution instance recovered in step 220 may either by a standby execution instance or an active execution instance.

Figure 4:
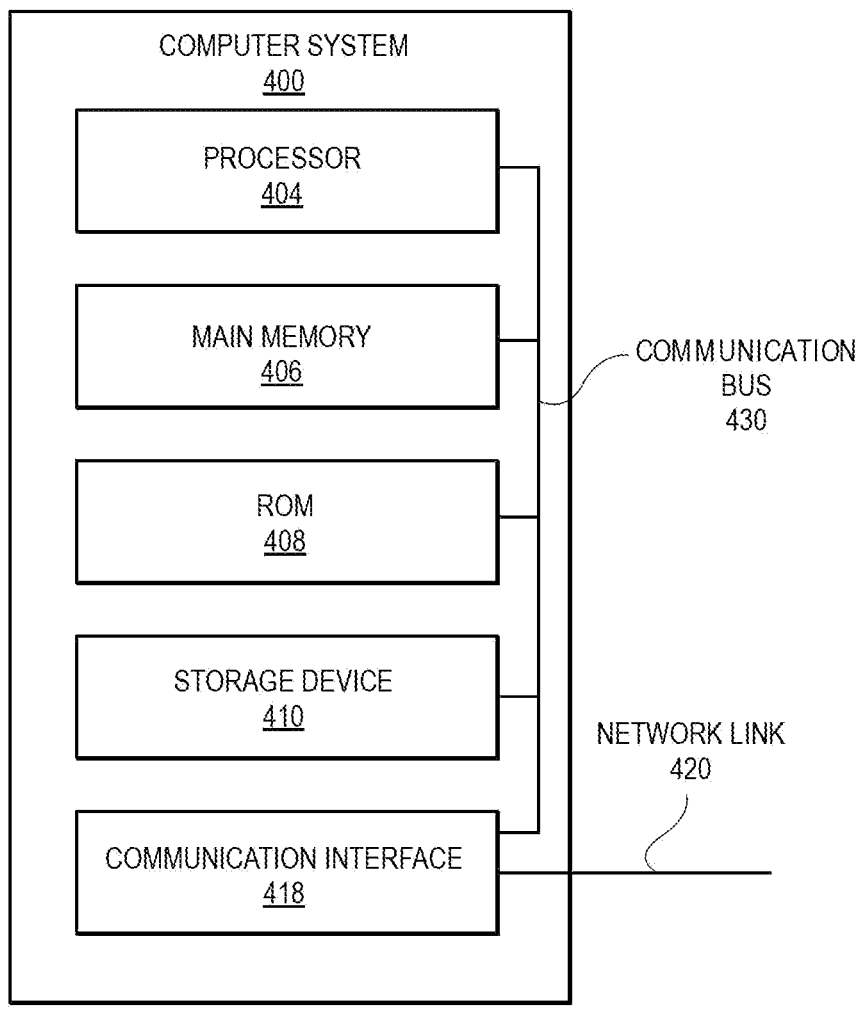
FIG. 4 is a block diagram of a computer system which may serve to provide compute resources and/or implement a node or component of a network in accordance with an embodiment of the invention.

FIG. 4 is a block diagram of a computer system which may serve to provide compute resources and/or implement a node or component of a network, such as a CCAP or PON network, upon which an execution instance executes or is deployed in accordance with an embodiment of the invention. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random-access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory computer-readable storage medium" as used herein refers to any tangible medium that participates in storing instructions which may be provided to processor 404 for execution. Non-limiting, illustrative examples of non-transitory machine-readable media include, for example, a solid-state device, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory computer-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for recovering or restarting an execution instance, which when executed by one or more processors, cause:
   in response to detecting that a particular execution instance, in which a cable modem termination system (CMTS) software application executes, has failed, performing:
      (a) restarting the particular execution instance without adding any downstream service flow classifiers to the particular execution instance or configuring any entries of an access control list for the particular execution instance; and
      (b) after restarting the particular execution instance, over time adjusting the configuration of the particular execution instance to add one or more downstream service flow classifiers and/or access control list entries such that the particular execution instance can provide additional services, beyond a default service flow, to cable modems serviced by the particular execution instance.

2. The non-transitory computer-readable storage medium of claim 1, wherein the particular execution instance, after being restarted and before the adjustment of said configuration, can service only a default service flow, and no other services, provided to cable modems.

3. The non-transitory computer-readable storage medium of claim 1, wherein the particular execution instance is an active instance.

4. The non-transitory computer-readable storage medium of claim 1, wherein the particular execution instance is a standby instance.

5. The non-transitory computer-readable storage medium of claim 1, wherein the particular execution instance is one of a plurality of execution instances which are restarted contemporaneously with each other and without both (a) the addition of any downstream service flow classifiers thereto and (b) the configuration of any entries of an access control list therefor.

6. The non-transitory computer-readable storage medium of claim 1, wherein the configuration of the particular execution instance is adjusted over time to optimize the rebuilding of one or more of downstream service flow classifiers and access control list entries for particular execution instance.

7. The non-transitory computer-readable storage medium of claim 1, wherein the configuration of the particular execution instance is adjusted over time in accordance with requirements of a service level agreement (SLA).

8. The non-transitory computer-readable storage medium of claim 1, wherein the configuration of the particular execution instance is adjusted over time in accordance with load upon hardware and/or software resources.

9. The non-transitory computer-readable storage medium of claim 1, wherein one or more service flow classifiers are added to the particular execution instance by deserializing the one or more service flow classifiers from a persistent storage medium into a data structure without rebuilding the one or more service flow classifiers from scratch.

10. A non-transitory computer-readable storage medium storing one or more sequences of instructions for recovering a failed execution instance, which when executed by one or more processors, cause:
    in response to detecting that a particular execution instance, in which a cable modem termination system (CMTS) software application executes, has failed, performing:
       (a) restarting the particular execution instance having only downstream service flow classifiers and entries of an access control list for the particular execution instance to support voice calls; and
       (b) after restarting the particular execution instance, over time adjusting the configuration of the particular execution instance to add one or more downstream service flow classifiers or access control list entries such that the particular execution instance can provide additional services, other than default service flows and voice calls, to cable modems serviced by the particular execution instance.

11. A non-transitory computer-readable storage medium storing one or more sequences of instructions for recovering a failed execution instance, which when executed by one or more processors, cause:
  in response to detecting that a particular execution instance, in which an optical line terminal (OLT) and/or broadband network gateway (BNG) software application in a passive optical network (PON) executes, has failed, performing:
    (a) restarting the particular execution instance without adding any downstream service flow classifiers to the particular execution instance or configuring any entries of an access control list for the particular execution instance; and
    (b) after restarting the particular execution instance, over time adjusting the configuration of the particular execution instance to add one or more downstream service flow classifiers or access control list entries such that the particular execution instance can provide additional services, beyond a default service flow, to optical network units (ONUs) serviced by the particular execution instance.

12. An apparatus for recovering or restarting an execution instance, comprising:
  one or more processors; and
  one or more non-transitory computer-readable storage mediums storing one or more sequences of instructions, which when executed, cause:
    in response to detecting that a particular execution instance, in which a cable modem termination system (CMTS) software application executes, has failed, performing:
      (a) restarting the particular execution instance without adding any downstream service flow classifiers to the particular execution instance or configuring any entries of an access control list for the particular execution instance; and
      (b) after restarting the particular execution instance, over time adjusting the configuration of the particular execution instance to add one or more downstream service flow classifiers and/or access control list entries such that the particular execution instance can provide additional services, beyond a default service flow, to cable modems serviced by the particular execution instance.

13. The apparatus of claim 12, wherein the particular execution instance, after being restarted and before the adjustment of said configuration, can service only a default service flow, and no other services, provided to cable modems.

14. The apparatus of claim 12, wherein the particular execution instance is an active instance.

15. The apparatus of claim 12, wherein the particular execution instance is a standby instance.

16. The apparatus of claim 12, wherein the particular execution instance is one of a plurality of execution instances which are restarted contemporaneously with each other and without both (a) the addition of any downstream service flow classifiers thereto and (b) the configuration of any entries of an access control list therefor.

17. The apparatus of claim 12, wherein the configuration of the particular execution instance is adjusted over time to optimize the rebuilding of one or more of downstream service flow classifiers and access control list entries for particular execution instance.

18. The apparatus of claim 12, wherein the configuration of the particular execution instance is adjusted over time in accordance with requirements of a service level agreement (SLA).

19. The apparatus of claim 12, wherein the configuration of the particular execution instance is adjusted over time in accordance with load upon hardware and/or software resources.

20. The apparatus of claim 12, wherein one or more service flow classifiers are added to the particular execution instance by deserializing the one or more service flow classifiers from a persistent storage medium into a data structure without rebuilding the one or more service flow classifiers from scratch.

21. An apparatus for recovering a failed execution instance, comprising:
  one or more processors; and
  one or more non-transitory computer-readable storage mediums storing one or more sequences of instructions, which when executed, cause:
    in response to detecting that a particular execution instance, in which a cable modem termination system (CMTS) software application executes, has failed, performing:
      (a) restarting the particular execution instance having only downstream service flow classifiers and entries of an access control list for the particular execution instance to support voice calls; and
      (b) after restarting the particular execution instance, over time adjusting the configuration of the particular execution instance to add one or more downstream service flow classifiers or access control list entries such that the particular execution instance can provide additional services, other than default service flows and voice calls, to cable modems serviced by the particular execution instance.

22. An apparatus for recovering a failed execution instance, comprising:
  one or more processors; and
  one or more non-transitory computer-readable storage mediums storing one or more sequences of instructions, which when executed, cause:
    in response to detecting that a particular execution instance, in which an optical line terminal (OLT) and/or broadband network gateway (BNG) software application in a passive optical network (PON) executes, has failed, performing:
      (a) restarting the particular execution instance without adding any downstream service flow classifiers to the particular execution instance or configuring any entries of an access control list for the particular execution instance; and
      (b) after restarting the particular execution instance, over time adjusting the configuration of the particular execution instance to add one or more downstream service flow classifiers or access control list entries such that the particular execution instance can provide additional services, beyond a default service flow, to optical network units (ONUs) serviced by the particular execution instance.

* * * * *